(12) United States Patent
Booth et al.

(10) Patent No.: US 8,600,779 B2
(45) Date of Patent: Dec. 3, 2013

(54) ADVERTISING WITH AN INFLUENTIAL PARTICIPANT IN A VIRTUAL WORLD

(75) Inventors: Ernest A. Booth, Bellevue, WA (US);
Tobin R. Titus, Issaquah, WA (US);
Erik Porter, Kirkland, WA (US);
Jeffrey D Carnahan, New York, NY (US); Daniel C Robbins, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1511 days.

(21) Appl. No.: 11/868,972

(22) Filed: Oct. 9, 2007

(65) Prior Publication Data

US 2009/0091565 A1   Apr. 9, 2009

(51) Int. Cl.
*G06Q 40/00* (2012.01)

(52) U.S. Cl.
USPC .......................... 705/4; 705/14.4; 705/14.68

(58) Field of Classification Search
USPC ........... 705/26, 14.61, 14.69, 14.17, 1.1, 319, 705/14.42, 14.71; 379/114.13
See application file for complete search history.

(56) References Cited

U.S. PATENT DOCUMENTS

| | | |
|---|---|---|
| 5,740,388 A | 4/1998 | Hunt |
| 5,880,731 A | 3/1999 | Liles et al. |
| 5,977,968 A | 11/1999 | Le Blanc |
| 6,036,601 A | 3/2000 | Heckel |
| 6,236,978 B1 | 5/2001 | Tuzhilin |
| 6,385,592 B1 | 5/2002 | Angles et al. |
| 6,476,830 B1 | 11/2002 | Farmer et al. |
| 6,775,581 B2 | 8/2004 | Landers et al. |
| 6,910,186 B2 | 6/2005 | Kim |
| 6,954,728 B1 | 10/2005 | Kusumoto et al. |
| 7,054,928 B2 | 5/2006 | Segan et al. |
| 7,101,284 B2 | 9/2006 | Kake et al. |
| 7,168,084 B1 | 1/2007 | Hendricks et al. |
| 7,212,985 B2 | 5/2007 | Sciuk |
| 7,249,139 B2 | 7/2007 | Chuah et al. |
| 7,257,552 B1 | 8/2007 | Franco |
| 7,421,660 B2 | 9/2008 | Charnock et al. |
| 7,484,176 B2 | 1/2009 | Blattner et al. |
| 7,568,004 B2 | 7/2009 | Gottfried |
| 7,792,801 B2 | 9/2010 | Hamilton et al. |

(Continued)

FOREIGN PATENT DOCUMENTS

JP       14023917 A    1/2002
KR    1020010105429 A  11/2001

(Continued)

OTHER PUBLICATIONS

Terdiman, "Meet the Metaverse, your new digital home", News.com, pp. 2.

(Continued)

*Primary Examiner* — Behrang Badii
(74) *Attorney, Agent, or Firm* — Hope Baldauff, LLC

(57) ABSTRACT

Technologies are described herein for advertising with an influential participant in a virtual world. A facilitator rating is determined for each of a plurality of participants in the virtual world. The facilitator rating may indicate an influence of each of the plurality of participants on other participants in the virtual world. One or more participants are identified from the plurality of participants based on the facilitator rating. The one or more participants are utilized to provide an advertisement in the virtual world.

9 Claims, 6 Drawing Sheets

(56) References Cited

U.S. PATENT DOCUMENTS

| | | | |
|---|---|---|---|
| 7,797,168 | B2 | 9/2010 | Kusumoto et al. |
| 7,996,264 | B2 | 8/2011 | Kusumoto et al. |
| 8,348,762 | B2 | 1/2013 | Willis et al. |
| 8,417,535 | B2 | 4/2013 | Kusumoto et al. |
| 2002/0002509 | A1* | 1/2002 | Wagorn et al. .................. 705/26 |
| 2002/0007314 | A1 | 1/2002 | Maruyama |
| 2002/0036654 | A1 | 3/2002 | Evans et al. |
| 2002/0040332 | A1 | 4/2002 | Maari et al. |
| 2002/0052881 | A1 | 5/2002 | Player |
| 2002/0052913 | A1 | 5/2002 | Yamada et al. |
| 2002/0065746 | A1 | 5/2002 | Lewis |
| 2004/0093266 | A1 | 5/2004 | Dohring |
| 2004/0148221 | A1 | 7/2004 | Chu |
| 2004/0153366 | A1* | 8/2004 | Olson et al. ..................... 705/14 |
| 2004/0248649 | A1 | 12/2004 | Arai et al. |
| 2004/0250210 | A1 | 12/2004 | Huang et al. |
| 2005/0060259 | A1 | 3/2005 | Holmes et al. |
| 2005/0149391 | A1 | 7/2005 | O'Shea et al. |
| 2005/0216346 | A1 | 9/2005 | Kusumoto et al. |
| 2005/0223328 | A1 | 10/2005 | Ashtekar et al. |
| 2005/0251553 | A1 | 11/2005 | Gottfried |
| 2006/0026064 | A1* | 2/2006 | Collins ........................... 705/14 |
| 2006/0100018 | A1 | 5/2006 | Ganz |
| 2006/0111979 | A1 | 5/2006 | Chu |
| 2006/0130095 | A1 | 6/2006 | Willis et al. |
| 2006/0155597 | A1 | 7/2006 | Gleason |
| 2006/0178975 | A1 | 8/2006 | Jung |
| 2006/0212561 | A1 | 9/2006 | Feng |
| 2006/0293958 | A1 | 12/2006 | Koenig |
| 2007/0035548 | A1 | 2/2007 | Jung et al. |
| 2007/0061333 | A1 | 3/2007 | Ramer et al. |
| 2007/0073582 | A1 | 3/2007 | Jung et al. |
| 2007/0087799 | A1 | 4/2007 | Van Luchene |
| 2007/0121843 | A1* | 5/2007 | Atazky et al. ............ 379/114.13 |
| 2007/0168863 | A1 | 7/2007 | Blattner et al. |
| 2007/0179867 | A1 | 8/2007 | Glazer et al. |
| 2007/0200846 | A1 | 8/2007 | Nakamura |
| 2007/0203817 | A1 | 8/2007 | Jung et al. |
| 2007/0218987 | A1 | 9/2007 | Van Luchene et al. |
| 2007/0243936 | A1 | 10/2007 | Binenstock et al. |
| 2007/0244750 | A1 | 10/2007 | Grannan et al. |
| 2007/0294096 | A1 | 12/2007 | Randall et al. |
| 2008/0059304 | A1 | 3/2008 | Kimsey |
| 2008/0163055 | A1 | 7/2008 | Ganz et al. |
| 2008/0163379 | A1 | 7/2008 | Robinson |
| 2008/0204450 | A1 | 8/2008 | Dawson et al. |
| 2008/0208684 | A1 | 8/2008 | Hamilton et al. |
| 2008/0215975 | A1 | 9/2008 | Harrison et al. |
| 2008/0254419 | A1 | 10/2008 | Cohen |
| 2008/0254426 | A1 | 10/2008 | Cohen |
| 2008/0262908 | A1 | 10/2008 | Broady et al. |
| 2008/0263446 | A1 | 10/2008 | Altberg et al. |
| 2009/0019541 | A1 | 1/2009 | Fontijn |
| 2009/0029769 | A1 | 1/2009 | Muller |
| 2009/0089310 | A1 | 4/2009 | Lara et al. |
| 2009/0094106 | A1 | 4/2009 | Porter et al. |
| 2009/0098939 | A1 | 4/2009 | Hamilton et al. |
| 2009/0119173 | A1* | 5/2009 | Parsons et al. .................. 705/14 |
| 2009/0132361 | A1 | 5/2009 | Titus et al. |
| 2009/0167766 | A1 | 7/2009 | Porter et al. |
| 2009/0192891 | A1 | 7/2009 | Titus et al. |
| 2009/0210301 | A1 | 8/2009 | Porter et al. |
| 2010/0058183 | A1 | 3/2010 | Hamilton et al. |

FOREIGN PATENT DOCUMENTS

| | | |
|---|---|---|
| KR | 100614899 B1 | 8/2006 |
| WO | WO 01/24083 | 4/2001 |
| WO | WO 2004/053799 | 6/2004 |

OTHER PUBLICATIONS

Dibbell, "The Life of the Chinese Gold Farmer", Jun. 17, 2007, New York Times, pp. 1-9.

"The IBM Innovate Quick internal metaverse project", 2007, pp. 1-8.
International Search Report dated Jun. 17, 2009 in International Application No. PCT/US2008/087879.
Benkoil, "Will Google's Virtual World Plans Change Virtual Ad Economics?", Oct. 16, 2007, JackMyers.com, pp. 1-2.
Keeves, "Real or Virtual? Play the intersection, and build communities!" Mar. 24, 2007, IBC Solutions—Future Thinking, 1 page.
Poppe, S., "What's the idea?", Sep. 28, 2007, retrieved Oct. 25, 2007 at http://spoppe.livejournal.com/tag/advertising, pp. 1-13.
Tarumi, et al., "Communication through Virtual Active Objects Overlaid onto the Real World", Sep. 2000, Proceedings of The Third International Conference on Collaborative Virtual Environments (CVE 2000), ACM, pp. 155-164.
Whang, et al., "Lifestyles of Virtual World Residents, Living in the on-line game, 'Lineage'", Dec. 3-5, 2003, Proceedings of 2003 International Conference on Cyberworlds (CW'03), pp. 18-25.
Woywood, T., "Advertising, Branding & Marketing in Social Virtual Worlds", 2006, www.newton2l,com, pp. 39-42.
Vedrashko, I., "Advertising in Computer Games", Sep. 2006, www.GamesBrandsPlay.com, 80 pages.
"Branding your Business with Avatars", retrieved Oct. 25, 2007, at http://www.pigandpanda.com/ebay-education/avatars.htm, Pig and Panda, pp. 1-3.
"The Buzz on . . . MMOGs and in-game advertising", retrieved Oct. 25, 2007, at www.iabuk.net/media/images/Thebuzzontheinternetsimpactongaming_1101.doc, Internet Advertising Bureau, pp. 1-13.
"Is this avatar attribute query issue I am thinking of valid?", Dec. 6, 2006, retrieved Oct. 25, 2007, at http://forums.activeworlds.com/showthread.php?p=39288, pp. 1-3.
"Marketing to Avatars", retrieved Oct. 25, 2007 at http://www.virtuallinks.net/?p=8, pp. 1-4.
"Second Life: Migration to Virtual Worlds and the Use of Time", Oct. 19, 2007, retrieved Oct. 26, 2007 at http://dusanwriter.wordpress.com/2007/10/19/second-life-migration-to-virtual-worlds-and-the-use-of-time/, 4 pages.
U.S. Official Action dated Aug. 5, 2010 in U.S. Appl. No. 11/943,610.
U.S. Official Action dated Feb. 3, 2011 in U.S. Appl. No. 11/868,967.
U.S. Official Action dated Jan. 24, 2011 in U.S. Appl. No. 11/943,610.
U.S. Official Action dated Jan. 25, 2011 in U.S. Appl. No. 11/965,732.
U.S. Official Action dated Nov. 17, 2010 in U.S. Appl. No. 12/022,122.
U.S. Official Action dated Dec. 8, 2010 in U.S. Appl. No. 12/031,683.
U.S. Official Action dated May 10, 2013 in U.S. Appl. No. 11/943,610.
U.S. Notice of Allowance dated Apr. 26, 2013 in U.S. Appl. No. 11/965,732.
U.S. Official Action dated Mar. 13, 2013 in U.S. Appl. No. 12/022,122.
U.S. Official Action dated Jul. 21, 2011 in U.S. Appl. No. 11/868,967.
U.S. Official Action dated Jul. 21, 2011 in U.S. Appl. No. 11/965,732.
U.S. Official Action dated Apr. 28, 2011 in U.S. Appl. No. 12/022,122.
U.S. Official Action date Aug. 9, 2011 in U.S. Appl. No. 12/031,683.
U.S. Official Action dated Aug. 31, 2012 in U.S. Appl. No. 11/965,732.
U.S. Official Action dated Jul. 9, 2012 in U.S. Appl. No. 12/022,122.
"Replace" and "Transaction" Merriam-Webster, Incorporation, Merriam-Webster's Collegiate Dictionary, tenth Edition (1998) pp. 992, 1252.
Terdiman, "Meet the Metaverse, Your New Digital Home", Apr. 16, 2007, CNET Networks, pp. 1-2.
U.S. Notice of Allowance dated Aug. 7, 2013 in U.S. Appl. No. 11/868,967.
U.S. Official Action dated Aug. 30, 2013 in U.S. Appl. No. 12/022,122.

\* cited by examiner

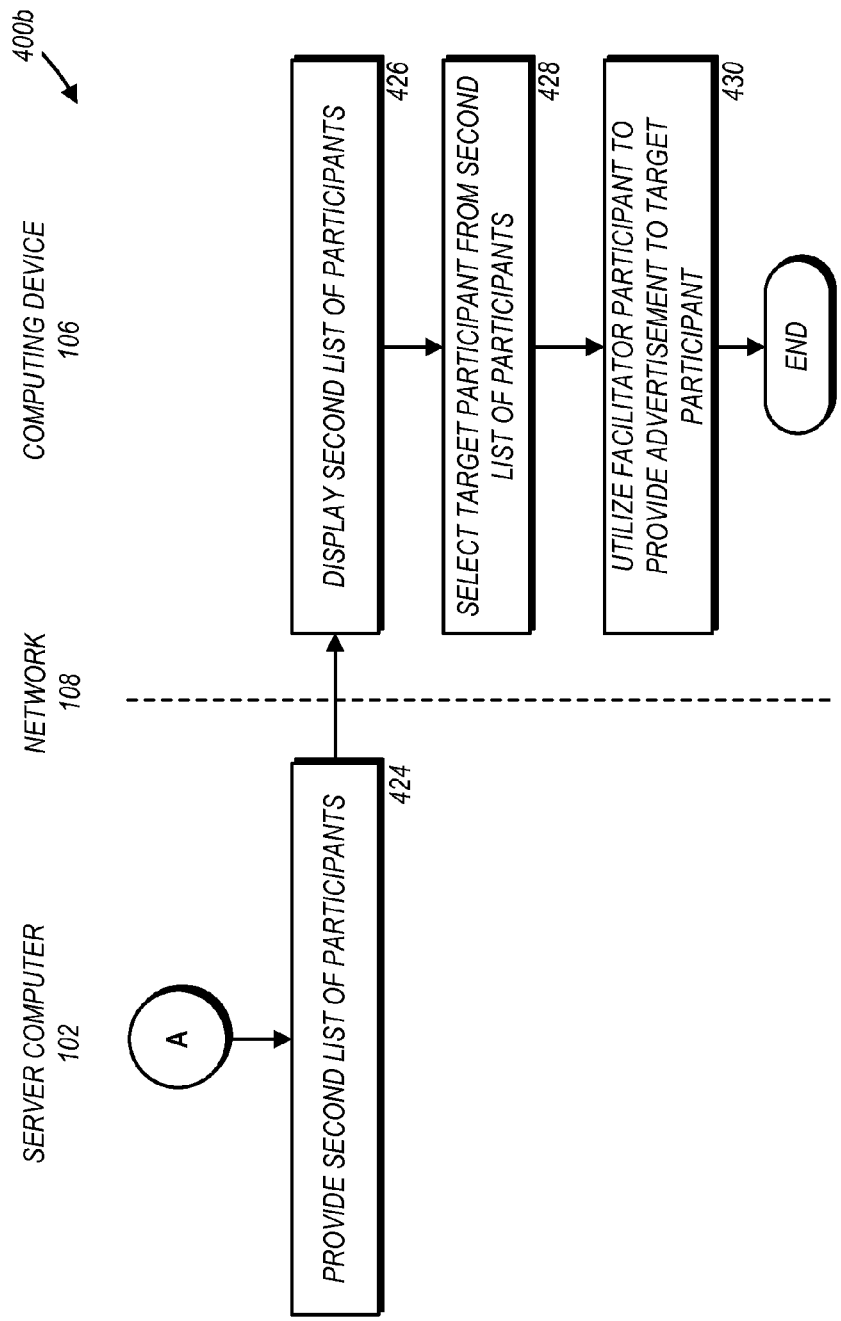

ADVERTISING WITH AN INFLUENTIAL PARTICIPANT IN A VIRTUAL WORLD

BACKGROUND

In recent years, massively multiplayer online ("MMO") computer applications, such as massively multiplayer role-playing games ("MMORPGs"), have become extremely popular not only with serious gamers, but also with casual gamers and other Internet users. One example of a MMO computer application enables a participant to create and develop a fictional character in a virtual world. The fictional character is usually associated with an avatar or some other visual representation that enables other participants to recognize the particular fictional character. A given participant may develop, among other things, a storyline, a reputation, and attributes of her fictional character by interacting in the virtual world via the fictional character. Other examples of MMO computer applications may not involve the creation of a virtual world representation of the participant.

The virtual world typically includes an environment with a variety of virtual locations containing a variety of virtual objects. In some cases, the virtual locations and the virtual objects mimic realistic locations and objects, while in other cases, the virtual locations and virtual objects are fanciful creations. MMO computer applications generally permit the fictional character to travel across the virtual locations and interact with the virtual objects and other fictional characters.

Advertising in the modern age has proven to be increasingly challenging. In particular, conventional advertising techniques have become less effective especially in recent times. Consumers are now provided with substantially more entertainment options than just a few years ago, thereby reducing the number of consumers that are exposed to a given advertisement. Further, new technologies, such as portable music players, satellite radio, and digital video recorders ("DVRs"), have allowed the users to avoid or skip conventional advertisements entirely.

As advertisers try to find ways to reach more consumers, one advertising medium that has become more attractive are virtual worlds, like MMO computer applications. The number of participants in MMO computer applications has steadily increased in recent times, and this trend shows little, if any, signs of reversing. Further, MMO computer applications provide a single entertainment destination for many Internet users and gamers, thereby enabling advertisers to reach a larger number of consumers through a single advertising medium. As computer and Internet technologies continue to improve to provide more and better ways to include real-world advertisements within the virtual world, MMO computer applications will continue to grow as a significant advertising medium.

It is with respect to these considerations and others that the disclosure made herein is presented.

SUMMARY

Technologies are described herein for advertising with an influential participant in a virtual world. In particular, through the utilization of the technologies and concepts presented herein, an interface may be provided that enables an advertiser, for example, to identify influential participants in the virtual world. A participant may be influential if the participant is suitable for providing an advertisement to other participants in the virtual world based on a criterion. Further, a participant may be influential if the participant is suitable for receiving an advertisement based on another criterion. This interface provides advertisers and other users the ability to easily identify those participants that are aptly suited to provide advertisements and/or to receive advertisements.

According to one aspect presented herein, a computer program determines a facilitator rating for a number of participants in the virtual world. The facilitator rating may indicate an influence of each participant on other participants in the virtual world. The computer program further identifies one or more participants based on the facilitator rating, and utilizes the one or more participants to provide an advertisement in the virtual world.

It should be appreciated that although the features presented herein are described in the context of a MMO computer application, these features may be utilized with any type of virtual world or environment including, but not limited to, other types of games as well as online social communities. It should also be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 4A and 4B are flow diagrams showing an illustrative process for determining an influential participant in a virtual world, in accordance with one embodiment.

DETAILED DESCRIPTION

Figure 1:
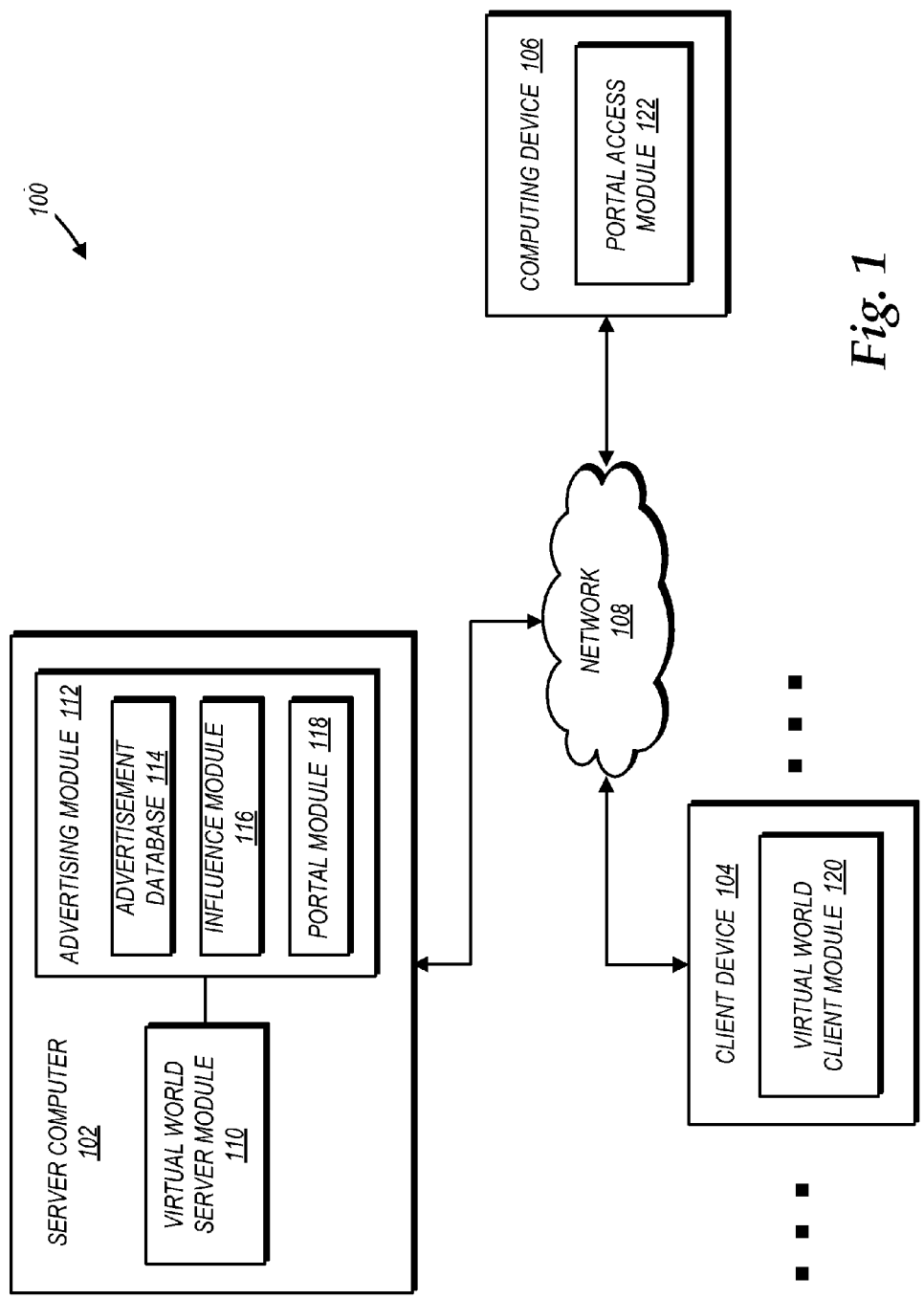
FIG. 1 is a network architecture diagram showing aspects of a network architecture capable of implementing a virtual world.

The following detailed description is directed to technologies for advertising with an influential participant in a virtual world. Through the utilization of the technologies and concepts presented herein, each participant in a virtual world may be associated with an influence level. The influence level may indicate the influence of a given participant on other participants in the virtual world, as well as the influence of the given participant on non-participants in the virtual world, such as advertisers and administrators of the virtual world. By utilizing the influence level, an advertiser, for example, may provide an advertisement to a greater number of consumers and/or focus an advertisement to targeted consumers. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

As used herein, the term virtual world refers to a computer-implemented environment, which may include simulated, lifelike environments as well as fanciful, non-existing environments. Exemplary virtual worlds may include any massively multiplayer online ("MMO") computer application including, but not limited to, massively multiplayer online role-playing games ("MMORPGs"), virtual social communities, and virtual reality computer applications. In one embodiment, the MMO computer application simulates a real world environment. For example, the virtual world may be defined by a number of rules, such as the presence of gravity or the lack thereof. In other embodiments, the MMO computer application includes a fanciful environment that does not simulate a real world environment.

The virtual world is generally inhabited by avatars, which are virtual or symbolic representations of real world participants (hereinafter referred to as participants). As such, each avatar is typically associated with and controlled by a particular participant. Avatars may include two-dimensional and/or three-dimensional images. Through the virtual world, the avatars may interact with other avatars, as well as with virtual objects. Virtual objects may include virtual representations of real world objects, such as houses, cars, billboards, clothes, and soda cans, as well as fanciful creations, such as a teleportation machine or a flying car. According to exemplary embodiments, one or more virtual objects and one or more avatars in the virtual world are capable of providing an advertisement. The avatars and the virtual objects utilized in the virtual world may or may not be animated images.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for providing advertising in a virtual world will be described. In particular, FIG. 1 illustrates a simplified network architecture 100 for a virtual world. The network architecture 100 shown in FIG. 1 includes a server computer 102, a client device 104, and a computing device 106, all of which are operatively coupled via a network 108. The network 108 may be any suitable network, such as a local area network ("LAN") or the Internet. Although only one client device 104 and one computing device 106 are illustrated in FIG. 1, the network architecture 100 may include multiple client devices and multiple computing devices in any suitable network configuration.

The client device 104 may be any suitable processor-based device, such as a computer or a gaming device. Exemplary gaming devices include the XBOX and the XBOX 360 from MICROSOFT CORPORATION, the WII from NINTENDO COMPANY, LIMITED, and the PLAYSTATION 3 and the PSP from SONY CORPORATION. Although not so illustrated in FIG. 1, the client device 104 may be coupled to any suitable peripheral devices to enable the participant to experience and interact with the virtual world. Exemplary peripheral devices may include an input device, such as a keyboard, a mouse, a microphone, and a game controller, and an output device, such as a display and speakers. Some peripheral devices may even provide both input and output functionality. For example, a game controller may provide vibration feedback.

As shown in FIG. 1, the client device 104 includes a virtual world client module 120, which interacts with the virtual world server module 110 executing on the server computer 102. In particular, the virtual world client module 120 may receive and process data from virtual world server module 110 and output the data to output devices coupled to the client device 104. Further, the virtual world client module 120 may receive data from input devices coupled to the client device 104 and transmit the data to the virtual world server module 110.

The virtual world client module 120 may include any suitable component for accessing the virtual world server module 110. In one example, the virtual world client module 120 may be a computer application configured to locally provide at least a portion of the virtual world for the client device 104. In this way, the amount of data retrieved from the server computer 102 by the client device 104 to generate the virtual world may be reduced. In another example, the virtual world client module 120 may be a web browser configured to retrieve the virtual world from the virtual world server module 110. Since many public computers, such as those found in Internet cafes, commonly have a web browser installed and prohibit the installation of new computer applications, providing participants a way to access the virtual world via the web browser may provide greater accessibility and convenience.

As shown in FIG. 1, the server computer 102 includes a virtual world server module 110 and an advertising module 112. The virtual world server module 110 generally administers the virtual world and serves as a conduit between multiple client devices, including the client device 104. The advertising module 112 generally enables an advertiser or other user to distribute advertising within the virtual world. The advertising module 112 may include an advertisement database 114, an influence module 116, and a portal module 118, as illustrated in FIG. 1. The advertisement database 114 may store one or more advertisements. The advertisement database 114 may include advertisements uploaded by an advertiser, for example. As described in greater detail below with respect to FIG. 3, the influence module 116 may determine an influence level of a participant. The influence level may include a measure (hereinafter referred to as a facilitator rating) indicating the influence of the participant on other participants in the virtual world, as well as another measure (hereinafter referred to as a target rating) indicating the influence of the participant on non-participants in the virtual world, such as advertisers, administrators of the virtual world, and observers. An advertiser, for example, may utilize the influence level to identify participants suitable for providing an advertisement in the virtual world and/or participants suitable for receiving an advertisement in the virtual world. For example, if a participant has a high influence on non-participants in the virtual world, the participant may be deemed to have a high relevance to receive an advertisement.

Although not so limited, embodiments described herein refer to an advertiser or other user accessing the advertisement database 114 via the portal module 118. In another embodiment, a participant accesses the advertisement database 114 via the virtual world client module 120. In this case, the participant may access the advertisement database 114 to select one or more advertisements to place on virtual objects owned by the participant. To encourage participants to place advertisements on their virtual objects, the advertisers corresponding to the selected advertisements may provide any suitable form of remuneration including, but not limited to, real world currency, virtual currency, real world objects, and virtual objects. In yet another embodiment, a participant serves as an representative representing other participants as clients. In this case, the representative participant may select one or more advertisements to place on virtual objects owned by the client participants. Similar to the above, the advertisers corresponding to the selected advertisements may provide any suitable form of remuneration to each of the client participants.

In one embodiment, the portal module 118 provides a website or other remote interface that enables an advertiser to access the advertisement database 114 and the influence module 116 via the network 108. In particular, the advertiser may utilize the computing device 106 to access the portal module 118. The computing device may include a portal access module 122 that enables communication with the portal module 118 via the network 108, as illustrated in FIG. 1. In one embodiment, the portal access module 122 is a web browser. As described in greater detail below with respect to FIG. 3, the website provided by the portal module 118 provides functionality that allows an advertiser to retrieve a list of participants that are suitable for providing an advertisement in the virtual world (hereinafter referred to as a facilitator rating list) from the influence module 116, and retrieve a list of participants that are suitable for receiving an advertisement in the virtual world (hereinafter referred to as a target rating list) also from the influence module 116. The advertiser may select one or more participants from a facilitator rating list (hereinafter referred to as facilitator participants) and/or one or more participants from a target rating list (hereinafter referred to as target participants).

The website provided by the portal module 118 may further provide functionality that allows an advertiser to select an advertisement. The advertising module 112 may place selected advertisements onto virtual objects owned by the avatars associated with the facilitator participants. Further, the advertising module 112 may place selected advertisements onto virtual objects anticipated to be viewed by the target participants. Participants utilizing their corresponding avatars can view the selected advertisements in the virtual world. Additional details regarding the facilitator rating list and the target rating list are provided below with respect to FIG. 3.

When a participant desires to access the virtual world, the participant may initiate the virtual world client module 120 to establish a session with the virtual world server module 110 via the network 108. During the session, the virtual world server module 110 may transmit data (e.g., environment layouts, avatar movements of other participants) associated with the virtual world to the virtual world client module 120. Similarly, the virtual world client module 120 may transmit data from associated input devices to the virtual world server module 110. The virtual world client module 120 may further interact with the advertising module 112 to provide advertisements in the virtual world. Alternatively, the virtual world server module 110 may act as a conduit between the virtual world client module 120 and the advertising module 112 such that virtual world client module 120 and the advertising module 112 need not directly communicate.

Figure 2:
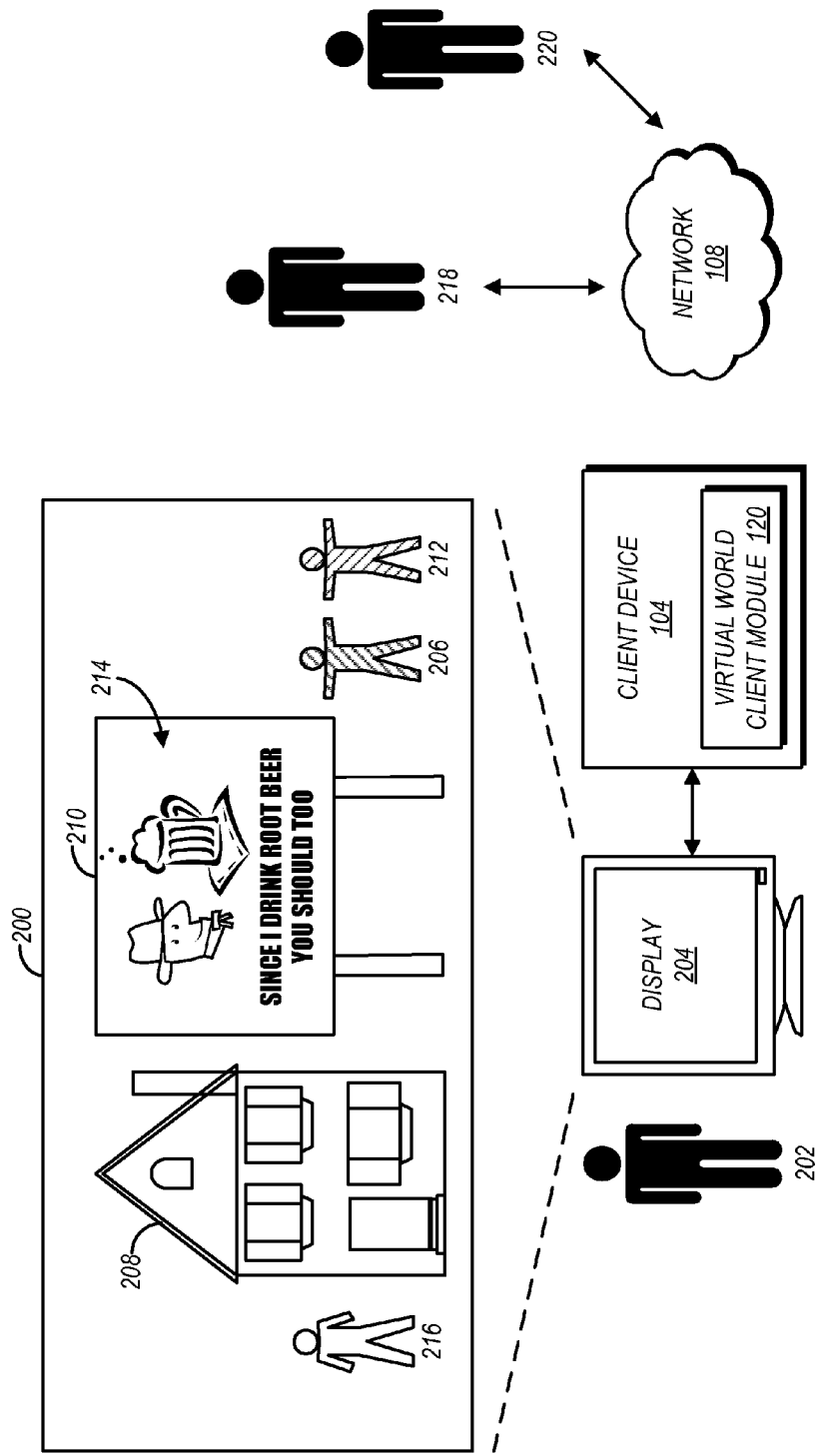
FIG. 2 is a screen display diagram showing an illustrative screenshot of the virtual world including an advertisement on a virtual object, in accordance with one embodiment.

Turning now to FIG. 2, an illustrative screenshot 200 of the virtual world provided by the virtual world server module 110 and the virtual world client module 120 is shown, in accordance with one embodiment. A first participant 202 may view the screenshot 200 on a display 204 operatively coupled to the client device 104. As shown in FIG. 2, the screenshot 200 includes a first avatar 206, a second avatar 212, and a third avatar 216. The first avatar 206 is a fictional representation of the first participant 202 in the virtual world. In one embodiment, the first participant 202 controls the movement of the first avatar 206 within the virtual world via an input device (not shown), such a keyboard, mouse, and game controller, operatively coupled to the client device 104. The first participant 202 may utilize the first avatar 206 to interact with other avatars, such as a second avatar 212 and a third avatar 216, in the virtual world. The second avatar 212 may be the fictional representation of a second participant 218 associated with a second client device (not shown) at a remote location. The third avatar 216 may be the fictional representation of a third participant 220 associated with a third client device (not shown) at another remote location.

The screenshot 200 further includes two virtual objects: a house 208 and a billboard 210. In this example, the first participant 202 and the second participant 218 are treated as targeted participants, and third participant 220 is treated as a facilitator participant. In particular, the third avatar 216 owns the house 208 and the billboard 210. Placed onto the billboard 210 is a root beer advertisement 214. In one embodiment, the third participant 220, by virtue of controlling the third avatar 216, receives income from an advertiser for leasing the space on the billboard 210 for the root beer advertisement 214. As illustrated in FIG. 2, the first avatar 206 and the second avatar 212 have moved next to the billboard 210. The first participant 202 can generally view the surroundings of the first avatar 206, as illustrated in the screenshot 200. Similarly, the second participant 218 can generally view the surroundings of the second avatar 212. As such, the first participant 202 and the second participant 218 can view the billboard 210. In one embodiment, both the first participant 202 and the second participant 218, when viewing the billboard 210 at the same time, view the root beer advertisement 214. In another embodiment, the first participant 202 and the second participant 218 view different advertisements even when viewing the billboard 210 at the same time. In other words, the advertisement shown by the billboard 210 may be tailored to the particular participant.

It should be appreciated that the screenshot 200 is only illustrative. In other embodiments, an advertisement, such as the root beer advertisement 214, may be placed on any suitable virtual object in the virtual world including, but not limited to, houses, cars, clothes, and signs. It should further be appreciated that the placed advertisement may be presented in any suitable multimedia format, such as text, picture, audio, video, and combinations thereof. The embodiments presented herein allow advertisers to easily identify influential participants, including facilitator participants and targeted participants. Additional details regarding this process are provided below with respect to FIGS. 3-4.

Figure 3:
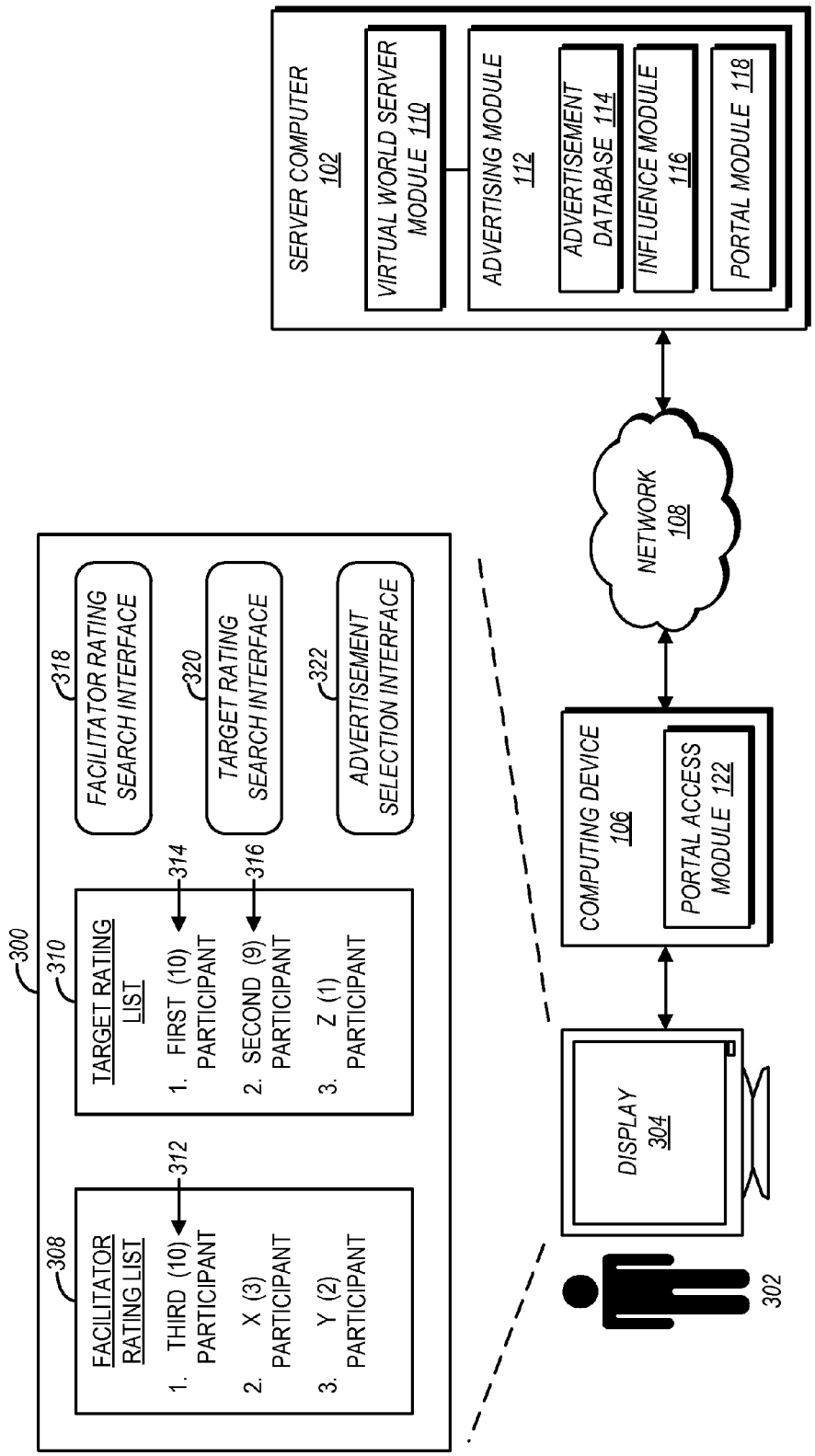
FIG. 3 is a screen display diagram showing an illustrative screenshot of an advertising interface including a facilitator rating list, a target rating list, a facilitator rating search interface, and a target rating search interface, in accordance with one embodiment.

Turning now to FIG. 3, an illustrative screenshot 300 of an advertising interface provided by the portal module 118 is shown. As previously mentioned, the advertising interface provided by the portal module 118 may be a website, according to one embodiment. An advertiser 302 may view the screenshot 300 on a display 304 operatively coupled to a computing device 106. The computing device 106 may be a desktop computer, a laptop computer, or other suitable processor-based device. The computing device 106 includes a portal access module 122, which may be a web browser, according to one embodiment. The advertiser 302 may utilize the portal access module 122 to remotely access the portal module 118 via the network 108. The portal module 118 provides the advertiser 302 access to a facilitator rating list 308 and a target rating list 310 generated by the influence module 116. In one embodiment, the facilitator rating list 308 and the target rating list 310 are presented in a graphical user interface ("GUI") format that enables the advertiser 302 to select facilitator participants from the facilitator rating list 308 and target participants from the target rating list 310.

As shown in FIG. 3, the facilitator rating list 308 provides a list of facilitator participants ranked from the highest facilitator rating and continuing downward. For example, the facilitator rating list 308 provides a first facilitator listing 312 identifying the third participant 220 as being associated with the highest facilitator rating. In parentheses at the first facilitator listing 312 is a facilitator rating of ten. In one embodiment, the facilitator rating is a number between one and ten with one indicating a lowest possible facilitator rating (i.e. indicating that the participant is worst suited to provide an advertisement) and ten indicating a highest possible facilitator rating (i.e., indicating that the participant is aptly suited to provide an advertisement). In other embodiments, the facilitator rating may be based on any suitable rating or scoring methodology.

In one embodiment, the facilitator rating of ten associated with the third participant 220 is determined based on a popularity of the third participant 220 in the virtual world. The facilitator rating may indicate an overall popularity of the third participant 220 among other participants in the virtual world. Alternatively, the facilitator rating may indicate the popularity of the third participant 220 among a select group of participants, such as those of a particular demographic. The popularity of the third participant 220 may be determined based on a variety of viewpoints, such as the viewpoints of the advertiser 302, the administrator of the virtual world, and other participants in the virtual world. These viewpoints may overlap and/or differ. For example, the advertiser 302 may consider the third participant 220 to be popular if the third participant 220 has a large network of friends, chats frequently (i.e., a high chat frequency), roams over a large area within the virtual world, logs into or accesses the virtual world frequently (i.e., a high login frequency), and the like. The administrator of the virtual world may consider the third participant 220 to be popular if the third participant 220 frequently logs on to the virtual world, spends a significant amount of time within the virtual world, generates a significant amount of content (e.g., text, pictures, audio, video, virtual objects) for the virtual world, and the like. The other participants in the virtual world may consider the third participant 220 to be popular if the third participant 220 generates high quality content, which can be rated by and adopted by the other participants, productively participates (i.e., a high quality of participation) in virtual world events and games, substantially participates (i.e., a high amount of participation) in virtual world events and games, provides technical support for the other participants in the virtual world, and the like.

In one embodiment, the advertiser 302 can retrieve the facilitator rating list 308 by accessing an facilitator rating search interface 318. The facilitator rating search interface 318 may be a search box, a pre-populated list, or other suitable interface. The facilitator rating search interface 318 may enable the advertiser 302 to input a facilitator search criterion to determine from the influence module 116 which facilitator participants are aptly suited for providing an advertisement. The facilitator rating search interface 318 may be utilized to retrieve any particular group of popular facilitator participants. For example, the advertiser 302 may want to retrieve facilitator participants that are most popular in a particular virtual town. If the advertiser 302 inputs the virtual town into the facilitator rating search interface 318, the portal module 118 may provide a facilitator rating list identifying the most popular facilitator participants in that virtual town. It should be appreciated that the facilitator search criterion may include any suitable criterion from the viewpoints of the advertiser, the administrator of the virtual world, and the other participants.

As shown in FIG. 3, the target rating list 310 provides a list of target participants ranked from the highest target rating and continuing downward. For example, the target rating list 310 includes a first target listing 314 and a second target listing 316. The first target listing 314 identifying the first participant 202 as being associated with the highest target rating. In one embodiment, the highest target rating associated with the first participant 202 indicates that the first participant 202 belongs in a demographic that is most ideal for the advertiser 302. The second target listing 316 identifies the second participant 218 as being associated with a second highest target rating. In parentheses at the first target listing 314 is a target rating of ten, and in parentheses at the second target listing 316 is a target rating of nine. In one embodiment, the target rating is a number between one and ten with one indicating a lowest possible target rating (i.e. indicating that the participant is least suited to receive an advertisement) and ten indicating a highest possible facilitator rating (i.e., indicating that the participant is aptly suited to receive an advertisement). In other embodiments, the target rating may be based on any suitable rating or scoring methodology.

In one embodiment, the advertiser 302 can retrieve the target rating list 310 by accessing a target rating search interface 320. The target rating search interface 320 may be a search box, a pre-populated list, or other suitable interface. The target rating search interface 320 may enable the advertiser 302 to input a target search criterion to determine from the influence module 116 which target participants are aptly suited for receiving an advertisement. The target rating search interface 320 may be utilized to retrieve target participants of any suitable demographic. For example, the advertiser 302 may want to retrieve target participants that are between the ages of eighteen and twenty-five. If the advertiser 302 inputs the age range into the target rating search interface 320, the portal module 118 may provide a target rating list identifying all of the target participants within that age range.

In addition to the facilitator rating search interface 318 and the target rating search interface 320, the portal module 118 further provides an advertisement selection interface 322. The advertisement selection interface 322 provides functionality that allows the advertiser 302 to select one or more advertisements from the advertisement database 114. In one embodiment, advertisement database 114 includes advertisements previously uploaded by the advertiser 302. If a facilitator participant is selected from the facilitator rating list 308, then the advertising module 112 may instruct the virtual world server module 110 to place selected advertisements on one or more virtual objects owned by the facilitator participant. If a target participant is selected from the target rating list 310, then the advertising module 112 may instruct the virtual world server module 110 to place selected advertisements on one or more virtual objects anticipated to be viewed by the target participant. If a facilitator participant and a target participant are selected, then the advertising module 112 may instruct the virtual world server module 110 to place selected advertisements on one or more virtual objects owned by the facilitator participant and anticipated to be viewed by the target participant.

Figure 4A:
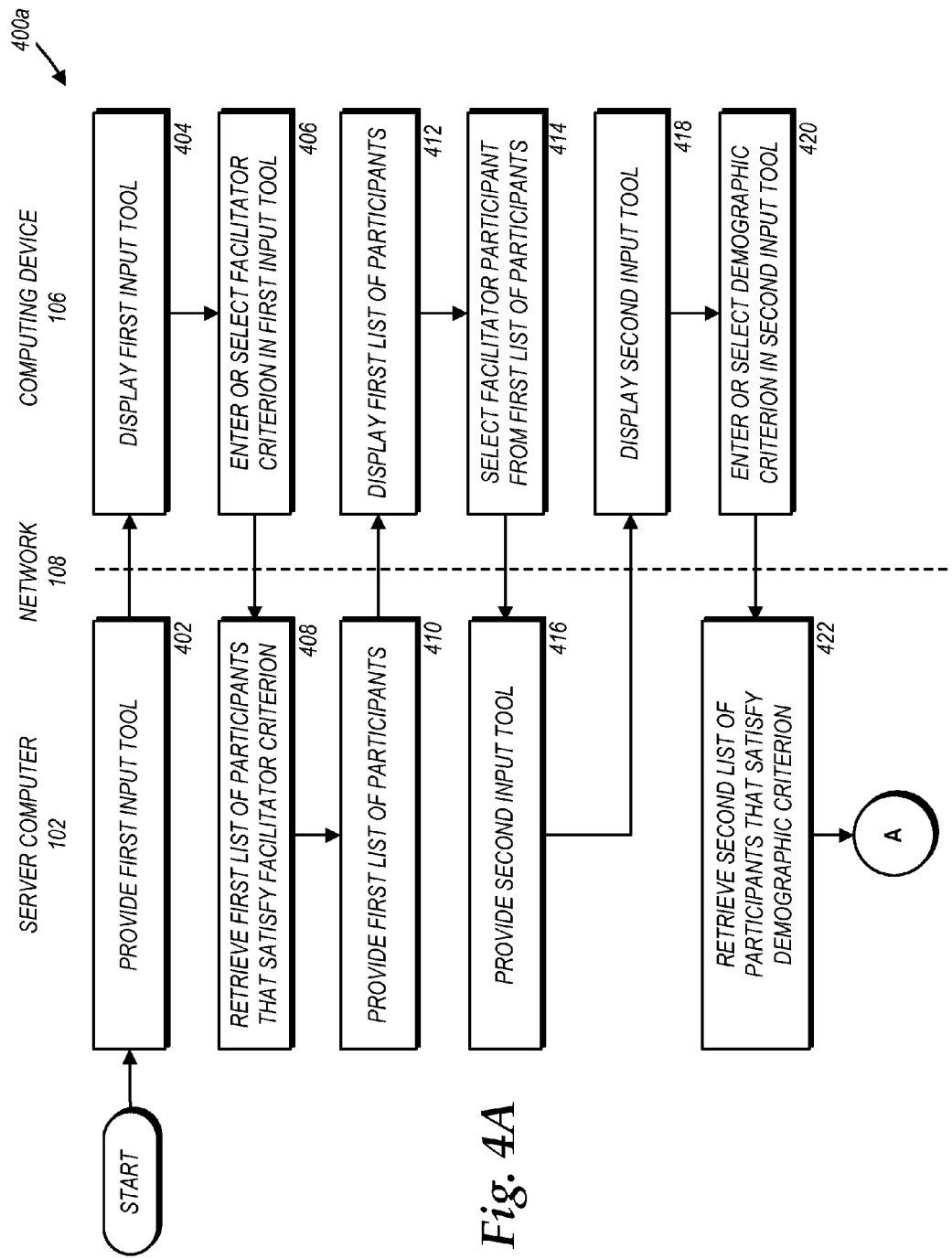

Referring now to FIGS. 4A and 4B, additional details will be provided regarding the embodiments presented herein for determining an influential participant in a virtual world. In particular, FIGS. 4A and 4B are flow diagrams illustrating aspects of one method provided herein for determining influential participants in a virtual world and providing advertisements based on the influential participants. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

Referring to FIG. 4A, the routine 400a begins at operation 402, where the portal module 118 provides a first input tool for entering or selecting a facilitator search criterion. For example, the portal module 118 may provide the facilitator rating search interface 318. After the portal module 118 provides the first input tool, the routine 400a continues to operation 404 where the portal access module 122 displays the first input tool on, for example, the display 304. At operation 406, the advertiser 302 enters or selects a facilitator search criterion in the facilitator rating search interface 318. In one embodiment, the facilitator search criterion specifies a particular group of popular participants. After the portal module 118 receives the facilitator search criterion from the portal access module 122, the routine 400a continues to operation 408.

At operation 408, the portal module 118 retrieves a first list of participants (i.e., facilitator participants) from the influence module 116 that satisfy the facilitator search criterion. For example, if the facilitator search criterion specifies popular participants located in a particular virtual town, the portal module 118 may retrieve a list of popular participants located in that virtual town. At operation 410, the portal module 118 provides the first list of participants, such as the facilitator rating list 308, to the portal access module 122. After the portal access module 122 receives the facilitator rating list 308 from the portal module 118, the routine 400a continues to operation 412 where the portal access module 122 displays the facilitator rating list 308. At operation 414, the advertiser 302 selects one or more facilitator participants from the facilitator rating list 308. For example, the advertiser 302 may select the third participant 220 identified by the first facilitator listing 312 in the facilitator rating list 308. After the portal access module 122 provides the selected facilitator participants to the portal module 118, the routine 400a continues to operation 416.

At operation 416, the portal module 118 provides a second input tool for entering or selecting a target search criterion. For example, the portal module 118 may provide the target rating search interface 320. After the portal module 118 provides the second input tool, the routine 400a continues to operation 418 where the portal access module 122 displays the second input tool on, for example, the display 304. At operation 420, the advertiser 302 enters or selects a target search criterion in the target rating search interface 320. In one embodiment, the target search criterion includes any suitable demographic criterion, such as the age, gender, or location of the participants. After the portal module 118 receives the target search criterion from the portal access module 122, the routine 400a continues to operation 422.

At operation 422, the portal module 118 retrieves a second list of participants (i.e., target participants) from the influence module 116 that satisfy the target search criterion. For example, if the target search criterion specifies participants within an age range of eighteen and twenty-five, the portal module 118 may retrieve a list of participants in that age range. The routine 400a of FIG. 4A continues to the routine 400b of FIG. 4B. Referring to FIG. 4B, at operation 424, the portal module 118 provides the second list of participants, such as the target rating list 310, to the portal access module 122. After the portal access module 122 receives the target rating list 310 from the portal module 118, the routine 400b continues to operation 426 where the portal access module 122 displays the target rating list 310. At operation 428, the advertiser 302 selects one or more target participants from the target rating list 310. For example, the advertiser 302 may select the first participant 202 and the second participant 218 identified by the first target listing 314 and the second target listing 316, respectively, in the target rating list 310. After the portal access module 122 provides the selected target participants to the portal module 118, the routine 400b continues to operation 430.

At operation 430, the portal module 118 utilizes the facilitator participant selected from the facilitator rating list 308 to provide an advertisement to the target participant selected from the target rating list 310. For example, the portal module 118 may utilize virtual objects, such as the billboard 210, owned by the third participant 220 to provide the root beer advertisement 214 to the first participant 202 and the second participant 218. If an avatar, such as the first avatar 206 and second avatar 212, come across the billboard 210, the first participant 202 and the second participant 218 controlling the first avatar 206 and the second avatar 212, respectively, may view the billboard 210 and be exposed to the root beer advertisement 214. As previously mentioned, the first participant 202 and the second participant 218 may also be exposed to different advertisements on the same billboard 210.

It should be appreciated that advertising pricing may be affected by the popularity of the participants who are targeted. For example, if the first participant 202 is more popular than the second participant 218, the price charged to the advertiser 302 to target the first participant 202 may be more than the price charged to target the second participant 218. The first participant 202 may be more popular than the second participant 218 if, for example, the first participant 202 is in higher demand by other advertisers than the second participant 218.

Figure 5:
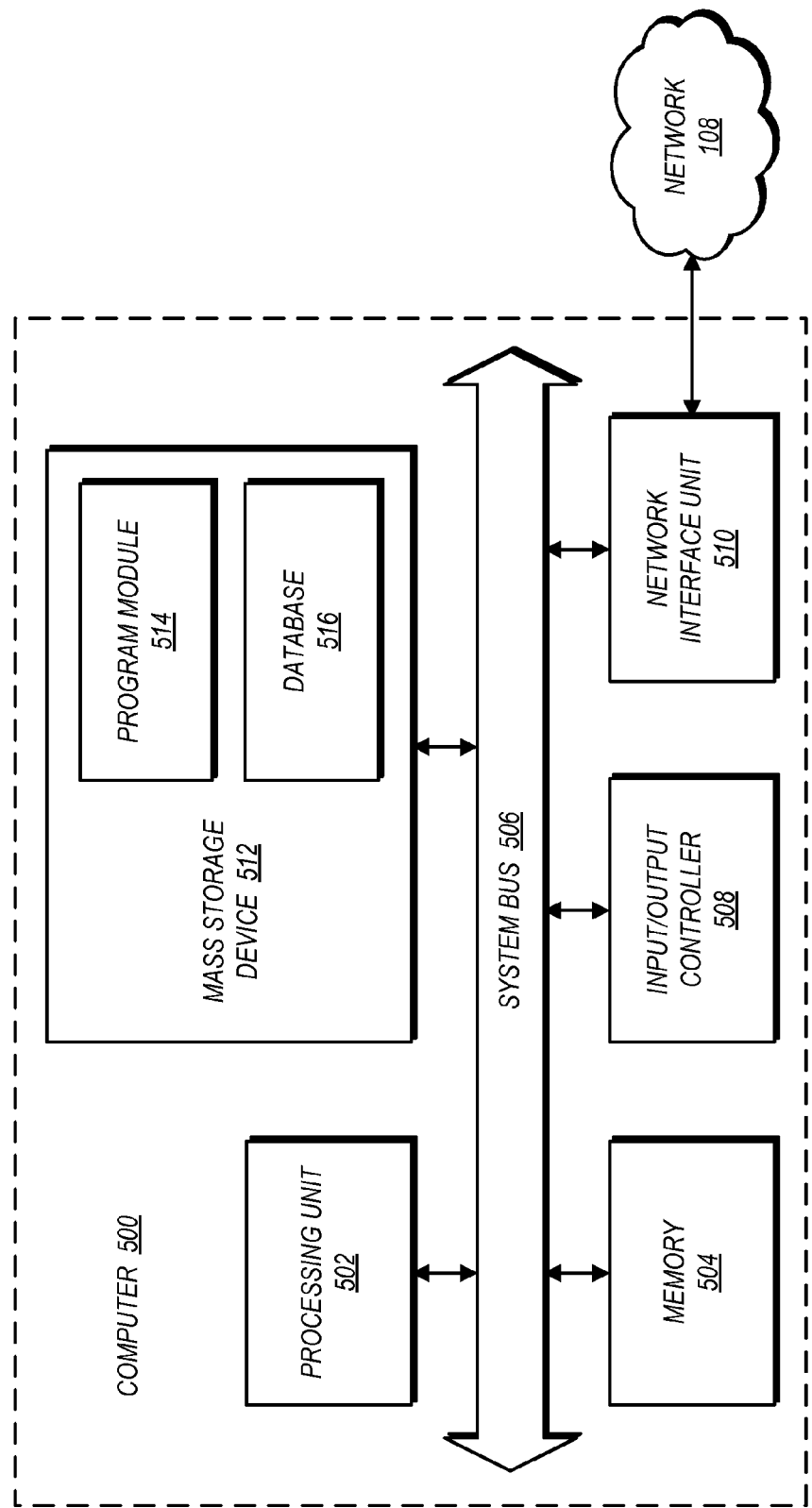
FIG. 5 is a computer architecture diagram showing aspects of an illustrative computer hardware architecture for a computing system capable of implementing the embodiments presented herein.

Referring now to FIG. 5, an exemplary computer architecture diagram showing aspects of a computer 500 is illustrated. Examples of the computer 500 may include the server computer 102, the client device 104, and the computing device 106. The computer 500 includes a processing unit 502 ("CPU"), a system memory 504, and a system bus 506 that couples the memory 504 to the CPU 502. The computer 500 further includes a mass storage device 512 for storing one or more program modules 514 and one or more databases 516. Examples of the program modules 514 may include the influence module 116, the portal module 118, the virtual world client module 120, and the portal access module 122. Examples of the databases 516 may include the advertisement database 114. The mass storage device 512 is connected to the CPU 502 through a mass storage controller (not shown) connected to the bus 506. The mass storage device 512 and its associated computer-readable media provide non-volatile storage for the computer 500. Although the description of computer-readable media contained herein refers to a mass storage device, such as a hard disk or CD-ROM drive, it should be appreciated by those skilled in the art that computer-readable media can be any available computer storage media that can be accessed by the computer 500.

By way of example, and not limitation, computer-readable media may include volatile and non-volatile, removable and non-removable media implemented in any method or technology for storage of information such as computer-readable instructions, data structures, program modules, or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 500.

According to various embodiments, the computer 500 may operate in a networked environment using logical connections to remote computers through a network such as the network 108. The computer 500 may connect to the network 108 through a network interface unit 510 connected to the bus 506. It should be appreciated that the network interface unit 510 may also be utilized to connect to other types of networks and remote computer systems. The computer 500 may also include an input/output controller 508 for receiving and processing input from a number of input devices (not shown), including a keyboard, a mouse, a microphone, and a game controller. Similarly, the input/output controller 508 may provide output to a display or other type of output device (not shown).

Based on the foregoing, it should be appreciated that technologies for advertising with an influential participant in a virtual world are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-readable medium having computer-executable instructions stored thereon which, when executed by a computer, cause the computer to:
   receive, by way of a network, a facilitator search criterion and a target search criterion;
   determine a facilitator rating for each of a plurality of participants in a virtual world based on the facilitator search criterion, the facilitator rating indicating an influence of each of the plurality of participants on other participants in the virtual world;
   determine a target rating for each of the plurality of participants in the virtual world based on the target search criterion, the target rating indicating a relevance of each of the plurality of participants to receive an advertiser supplied advertisement;
   provide a first list of participants ranked in order of influence in the virtual world according to the facilitator rating;
   provide a second list ranked in order of relevance to receive the advertisement according to the target rating;
   receive, by way of the network, a first user selected participant from the first list and a second user selected participant from the second list;
   upon receiving the first user selected participant from the first list and the second user selected participant from the second list, utilize the first user selected participant to provide the advertiser supplied advertisement to the second user selected participant in the virtual world;
   wherein the facilitator rating comprises a popularity level for each of the plurality of participants from a viewpoint of the advertiser;
   wherein the computer-executable instructions further cause the computer to determine the popularity level for each of the plurality of participants based on a number of friends associated with each of the plurality of participants, an amount of area roamed in the virtual world by each of the plurality of participants, and a chat frequency of each of the plurality of participants;
   wherein the facilitator rating comprises a popularity level for each of the plurality of participants from a viewpoint of an administrator of the virtual world;
   wherein the computer-executable instructions further cause the computer to determine the popularity level for each of the plurality of participants based on a login frequency of each of the plurality of participants, an amount of time spent by each of the plurality of participants in the virtual world, and an amount of content created by each of the plurality of participants for the virtual world;
   wherein the facilitator rating comprises a popularity level for each of the plurality of participants from a viewpoint of other participants in the virtual world; and,
   wherein the computer-executable instructions further cause the computer to determine the popularity level for each of the plurality of participants based on a quality of content created by each of the plurality of participants for the virtual world, an amount of participation by each of the plurality of participants in the virtual world, an amount of technical support provided by each of the plurality of participants for other participants in the virtual world, and a level of adoption of content created by each of the plurality of participants in the virtual world.

2. The computer-readable medium of claim 1, wherein to utilize the first user selected participant to provide the advertiser supplied advertisement to the second user selected participant in the virtual world, the computer-executable instructions further cause the computer to place the advertiser supplied advertisement onto a virtual object owned by the first user selected participant and viewable by the second user selected participant within the virtual world.

3. The computer-readable medium of claim 1, wherein to receive, by way of the network, the facilitator search criterion and the target search criterion, the computer-executable instructions further cause the computer to:
   provide, by way of the network, a graphical user interface adapted to receive user input of the facilitator search criterion;
   receive the user input of the facilitator search criterion via the interface; and determine the facilitator rating for each of the plurality of participants in the virtual world based on the facilitator search criterion.

4. The computer-readable medium of claim 1, wherein to receive, by way of the network, the facilitator search criterion and the target search criterion, the computer-executable instructions further cause the computer to:
provide, by way of the network, a graphical user interface adapted to receive user input of the target search criterion;
receive the user input of the target search criterion via the interface; and
determine the target rating for each of the plurality of participants in the virtual world based on the target search criterion.

5. The computer-readable medium of claim 1, wherein to determine the target rating for each of the plurality of participants in the virtual world, the computer-executable instructions further cause the computer to determine the relevance of each of the plurality of participants with respect to a demographic criterion.

6. The computer-readable medium of claim 5, wherein the demographic criterion comprises an age of each of the plurality of participants, a gender of each of the plurality of participants, and a location of each of the plurality of participants.

7. A computer-implemented method for advertising with an influential participant in a virtual world, the method comprising computer-implemented operations for:
receiving, at a computer and by way of a network, a facilitator search criterion and a target search criterion;
determining, by the computer, a numeric facilitator rating for each of a plurality of participants in the virtual world based on the facilitator search criterion, the numeric facilitator rating indicating an influence of each of the plurality of participants on other participants in the virtual world;
determining, by the computer, a numeric target rating for each of the plurality of participants in the virtual world based on the target search criterion, the numeric target rating indicating a relevance of each of the plurality of participants to receive an advertiser supplied advertisement;
providing, by the computer, a first list of participants ranked in order of influence in the virtual world according to the numeric facilitator rating;
providing, by the computer, a second list ranked in order of relevance to receive the advertisement according to the numeric target rating;
receiving, at the computer and by way of the network, a first user selected participant from the first list and a second user selected participant from the second list;
upon receiving the first user selected participant from the first list and the second user selected participant from the second list, utilizing, by the computer, the first user selected participant to provide the advertiser supplied advertisement to the second user selected participant in the virtual world;
wherein the facilitator rating comprises a popularity level for each of the plurality of participants from a viewpoint of the advertiser;
determine the popularity level for each of the plurality of participants based on a number of friends associated with each of the plurality of participants, an amount of area roamed in the virtual world by each of the plurality of participants, and a chat frequency of each of the plurality of participants;
wherein the facilitator rating comprises a popularity level for each of the plurality of participants from a viewpoint of an administrator of the virtual world;
determine the popularity level for each of the plurality of participants based on a login frequency of each of the plurality of participants, an amount of time spent by each of the plurality of participants in the virtual world, and an amount of content created by each of the plurality of participants for the virtual world;
wherein the facilitator rating comprises a popularity level for each of the plurality of participants from a viewpoint of other participants in the virtual world; and,
determine the popularity level for each of the plurality of participants based on a quality of content created by each of the plurality of participants for the virtual world, an amount of participation by each of the plurality of participants in the virtual world, an amount of technical support provided by each of the plurality of participants for other participants in the virtual world, and a level of adoption of content created by each of the plurality of participants in the virtual world.

8. The computer-implemented method of claim 7, wherein the virtual world comprises a massively multiplayer online (MMO) environment.

9. The computer-implemented method of claim 7, wherein the virtual world comprises a massively multiplayer online role playing game (MMORPG) environment.

* * * * *